UNITED STATES PATENT OFFICE.

EDWD. SATTERLEE, OF ALBANY, NEW YORK.

IMPROVEMENT IN PROCESSES FOR BURNISHING METALS.

Specification forming part of Letters Patent No. 6,200, dated March 20, 1849.

*To all whom it may concern:*

Be it known that I, EDWARD SATTERLEE, of the city and county of Albany, and State of New York, have invented a new and useful mode of preparing surfaces of cast or wrought iron or other metals and stone so that they may be gilded or silvered in the same manner as wood, and burnished with equal facility; and I do hereby declare that the subjoined is a full, clear, and exact description of my process.

The nature of my invention consists in covering the surface of the metal or stone to be gilded with a coating which possesses the properties of adhering firmly thereto, while it readily receives and strongly retains the gilders' materials or preparations and possesses all the firmness requisite to permit the free use of the burnishing-tools.

The surface to be gilded having been first thoroughly cleansed from any adhering dirt or grease, (which may be readily effected by washing with dilute acid and rinsing with pure water,) is covered with a solution of gum-shellac in alcohol, prepared by dissolving one part of shellac in four parts of alcohol. This mixture is laid on with a suitable brush, and when it has become dry a second coating composed of shellac, alcohol, and yellow ocher, or other suitable earthy or mineral substances possessing similar properties, is laid over it. The proportions of this last-named preparation are about one part shellac, one part ocher, and four parts alcohol, to which may be added a small quantity of vermilion to deepen the color.

The object of preparing the first coating without the admixture of ocher and vermilion is that being of a thinner body it will penetrate more readily the pores and minute interstices of the metal or stone, and consequently adhere more firmly. The second coat having become dry, another coat of alcohol, shellac, and yellow ocher in the proportions of six parts of alcohol, two of shellac, and six of yellow ocher is applied to its surface. The proportions of the above ingredients must, however, be varied according to the smoothness or roughness of the surface to be gilded, smooth surfaces requiring a less proportion of ocher.

The absorbent properties of the yellow ocher render the surface coated with the above-described preparations capable of receiving, uniting with, and retaining the materials used by the gilder in the subsequent part of the operation. Various earths and other substances possessing the requisite absorbent properties may be substituted for the yellow ocher, though I prefer this latter as being best adapted for the purpose.

Instead of alcohol, any other suitable volatile menstruum may be employed to dissolve the shellac. The vermilion is added to the second coat merely as a coloring-matter.

Those parts of the work which are to be burnished will sometimes require one or more repetitions of the last-described coating in order to give sufficient thickness to allow the surface, when dry, to be rubbed down with sandpaper. When the surface to be gilded is quite smooth I have found the addition of a small portion of drying oil or japan to the first preparation to be of service. The work having been prepared in the manner above described, and the last coat having become dry, the surface is rubbed down with sand-paper, and it is then ready to receive the preparations ordinarily used in water-gilding or gilding upon wood, which may now be laid on as follows: If the parts are to be burnished, first apply three coats of clay and size, followed by three coats of gold size, always allowing each coat to become dry before the application of another. Sometimes a thin coat of whiting and size applied before the coating of clay and size can be used with advantage where the surface to be burnished is flat; but as the whiting is apt to crack I prefer not using it when it can be avoided.

When the leaf is to be applied the surface of the coating of gold size is moistened with a little spirits and water, and when dry can be burnished. To those parts which are not to be burnished the leaf is applied in the usual way adopted by gilders in water-gilding.

I have contemplated the application of my process chiefly to the gilding of cast-iron frames for pictures, mirrors, ornamental furniture, &c. In the present advanced state of the art of iron-founding these may be produced of exceeding lightness from patterns most elaborately carved; but heretofore no means of gilding them in such a manner as to admit of burnishing has been discovered.

I wish it to be understood that I do not claim the employment of shellac for covering surfaces as a varnish, that having already been done, and it has already been used for other purposes; but

What I claim as my invention, and desire to secure by Letters Patent, is—

The mode herein described of preparing surfaces of cast or wrought iron or other metals and stone so that they may be gilded or silvered in the same manner as wood and burnished with equal facility—viz., by applying thereto the preparations of shellac and yellow ocher, or other similar and suitable earthy or mineral substances, herein set forth and described.

EDWARD SATTERLEE.

Witnesses:
STEPHEN YATES,
E. R. SATTERLEE.